United States Patent
Angermayr et al.

(10) Patent No.: US 7,257,215 B2
(45) Date of Patent: Aug. 14, 2007

(54) LOAD SHARING IN SS7 NETWORKS

(75) Inventors: Manfred Angermayr, Schrobenhausen (DE); Hanns Jürgen Schwarzbauer, Gröbenzell (DE); Michael Tüxen, Oldenburg (DE)

(73) Assignee: Siemens Aktiengesellschaft, Munich (DE)

( * ) Notice: Subject to any disclaimer, the term of this patent is extended or adjusted under 35 U.S.C. 154(b) by 762 days.

(21) Appl. No.: 10/637,044

(22) Filed: Aug. 8, 2003

(65) Prior Publication Data
US 2004/0114533 A1    Jun. 17, 2004

Related U.S. Application Data

(60) Provisional application No. 60/403,654, filed on Aug. 16, 2002.

(51) Int. Cl.
*H04M 7/00* (2006.01)
(52) U.S. Cl. .............. 379/221.08; 379/88.17; 379/221.12; 379/229; 379/230; 370/466; 370/467
(58) Field of Classification Search ........ 379/88.17, 379/221.08, 221.12, 229, 230; 370/466, 370/467
See application file for complete search history.

(56) References Cited

U.S. PATENT DOCUMENTS

| 6,175,574 | B1 * | 1/2001 | Lewis | 370/522 |
| 7,068,773 | B2 * | 6/2006 | McCann et al. | 379/229 |
| 7,130,408 | B2 * | 10/2006 | Creamer et al. | 379/221.08 |

FOREIGN PATENT DOCUMENTS

EP    0 912 068 A2    4/1999

OTHER PUBLICATIONS

Jabbari B: "Routing and Congestion Control in Common Channel Signaling System No. 7"; Proceedings of the IEEE, 8D 80; Nr. 4; Apr. 4, 1992. pp. 607-617 ; XP000304351.
International Telecommunication Union "Signalling network functions and messages" ITU-T Recommendation Q704. Jul. 1996; XP002196391; Capitel 2.3.1.
International Telecommunication Union "Introduction to CCITT signaling system No. 7"; ITU-T Recommendation Q.700, Mar. 1993, XP002231162; Capitel; 5.2.

* cited by examiner

*Primary Examiner*—Quynh H. Nguyen
(74) *Attorney, Agent, or Firm*—Bell Boyd & Lloyd LLP

(57) ABSTRACT

A service indicator SI field is used for load sharing in SS7 networks, in addition to the service link selection SLS field. If there are only two links or connections between two points of the SS7 network, load sharing can also be performed on the basis of the SI field only.

4 Claims, 1 Drawing Sheet

LOAD SHARING IN SS7 NETWORKS

CLAIM FOR PRIORITY

This application claims the benefit of priority to U.S. Provisional Application Ser. No. 60/403,654, which was filed on Aug. 16, 2002, the contents of which are hereby incorporated by reference.

TECHNICAL FIELD OF THE INVENTION

The present invention relates to load sharing in networks, and in particular, to a system and method for load sharing for links or link sets between a first signaling point and a second signaling point in communications networks.

BACKGROUND OF THE INVENTION

In communications networks in which the central Signaling System No. 7 standardized by the International Telecommunication Union ITU or Common Channel Signaling System 7 CCS7, also called SS7, conforming to the ITU-T Q.700 Recommendations and following is used for transmitting messages, the communication between two signaling points SP, i.e. nodes and/or end points of the communications network, takes place via connections which in this context are called signaling links or SS7 links. A node is also referred to as a signaling transfer point STP, whereas an end point, in contrast, is also referred to as a signaling end point SEP.

As described in ITU-T Q.700ff, it is possible in SS7 communications networks to combine signaling links into so-called signaling link sets. Each signaling link set comprises at least one signaling link.

The architecture of SS7 is also described in ITU-T Q.700ff. A distinction is made between different protocol layers, called levels in this context. Levels 1-3 form the Message Transfer Part MTP. A number of Level 4 protocols are defined in SS7 and here are called User Parts UP. Examples of these are the Telephone User Part TUP, the ISDN User Part ISUP or the Signaling Connection Control Part SCCP. Messages of these User Parts are transferred securely by the MTP. In this case a so-called service indicator SI is used in order to distinguish the individual User Parts. The SI is a 4-bit value; the following assignment to the User Parts applies (extract shown):

| SI | MTP User |
|---|---|
| 0 | Signaling Network Management Messages (SNM) |
| 1 | Maintenance Regular Messages (MTN) |
| 2 | Maintenance Special Messages (MTNS) |
| 3 | Signaling Connection Control Part (SCCP) |
| 4 | Telephone User Part (TUP) |
| 5 | ISDN User Part (ISUP) |
| 6 | Data User Part (call and circuit-related messages) |
| 7 | Data User Part (facility registration/cancellation messages) |
| 8 | MTP Testing User Part |

The MTP, particularly MTP Level 3, also handles the administration of the links. If there are multiple link sets and/or multiple links between two signaling points, load distribution or load sharing, among other functions, is effected by MTP Level 3 on the basis of the so-called signaling link selection field SLS, described in ITU-T Q.704. The SLS value is part of the so-called routing label and has a length of 4 bits.

In known SS7 implementations, load sharing has been carried out until now solely on the basis of the value included in the SLS field. This is insufficient in certain application scenarios, however. In ITU-T Q.700 Section 3.2.1 and in ITU-T Q.704 Section 2.3.1 it is mentioned in each case that the routing of messages, though not load sharing, can also be performed on the basis of the service indicator SI.

SUMMARY OF THE INVENTION

The present invention discloses a system and method for load distribution or for load sharing in SS7 networks which is based on the service indicator and which involves low implementation overhead.

One aspect of the present invention is that the SI field which is included in the MTP header of the message signaling unit MSU is also used for load sharing in SS7 networks in addition to the normally used SLS field included in the routing label of messages or message signaling units MSU. If there are only two links or connections between two points of the SS7 network, then load sharing can also be effected on the basis of the SI field.

One advantage is that the SI field is representative of the User Part of the MSU and therefore load sharing can be performed based on the User Part of the MSU. According to the above table, the service indicator SI "5"="0101B" is provided, for example, for the ISDN User Part ISUP, whereas an SI "3"="0011B" is used for the Signaling Connection Control Part SCCP. As can be read from the specified binary representation of the SI values for SCCP and ISUP, it is possible to distinguish these two User Parts by evaluation of the bits with a significance of "2" or "4", i.e. Bit $2^1$ or $2^2$.

Load sharing based on the User Part of an MSU has in turn a number of advantages. One of these advantages is that, for example, separate links and/or link sets can be provided for SCCP messages and for ISUP messages. SCCP messages are longer on average than ISUP messages, with the result that send buffers of signaling points are more heavily loaded by SCCP messages than by ISUP messages. This can lead in turn to ISUP messages being obstructed or delayed by SCCP messages. However, this should be avoided in application situations in which ISUP messages are assigned a higher priority than SCCP messages. This is advantageously achieved by the present invention.

A further advantage is based on the fact that with conventional load sharing the traffic can be distributed over only 16 links, since the SLS value is a 4-bit value. This number can be expanded by using the SI field, which also comprises 4 bits. The already mentioned distinction between SCCP and ISUP messages, for example, results in a doubling of the number to 32 possible links or link sets, consisting of 16 for ISUP messages and 16 for SCCP messages.

The invention can advantageously be used in conjunction with other methods which extend the address space opened up by the SLS field, in which case the number of possible links/link sets is then doubled once again, for example when a distinction is made between SCCP and ISUP messages.

Except for the implementation of the improved load sharing method, the invention requires no modifications to be made to components of the communications network and can therefore be implemented easily and cost-effectively. In particular, the method relates to the sending component(s); no provision needs to be made for modifications to the receiving component(s).

Through evaluation of the SI field, which is part of the service information octet SIO, which is in turn part of the MTP header, load sharing in accordance with the transported protocol layers or User Parts can be performed quickly and without analysis of the protocol layers transported by means of the MTP. This coding which is fixed for each message has the advantageous consequence that an evaluation can be largely hardware-based and is therefore particularly suitable for use in signaling points, more particularly in signaling transfer points, for which there are high requirements in terms of throughput and message transmission delays.

According to the invention, a network element is also provided which comprises means for performing the inventive load sharing method.

The method according to the invention can advantageously be used without any problem in conjunction with other load sharing methods. If a conventional load sharing method includes, for example, the following:

(a) Generate a list of possible link sets to the desired destination, for example on the basis of the SS7 destination point code DPC, (b) Select one of the link sets; in traditional implementations this is done solely on the basis of the SLS value, whereas in more recent implementations, in contrast, it is also done for example on the basis of further fields of an MSU, (c) Select a link within the link set selected in step (b), for example again on the basis of the SLS value and/or of further fields, where other bit positions of the fields considered are usually used for steps (b) and (c) so that steps (b) and (c) are independent of each other, then, according to the invention, the selection of the link sets or links can be made additionally or exclusively on the basis of the SI field, the rest of the selection method remaining untouched.

BRIEF DESCRIPTION OF THE DRAWINGS

The invention is explained in more detail below as an exemplary embodiment with reference to the figures.

DETAILED DESCRIPTION OF THE INVENTION

Figure 1A:
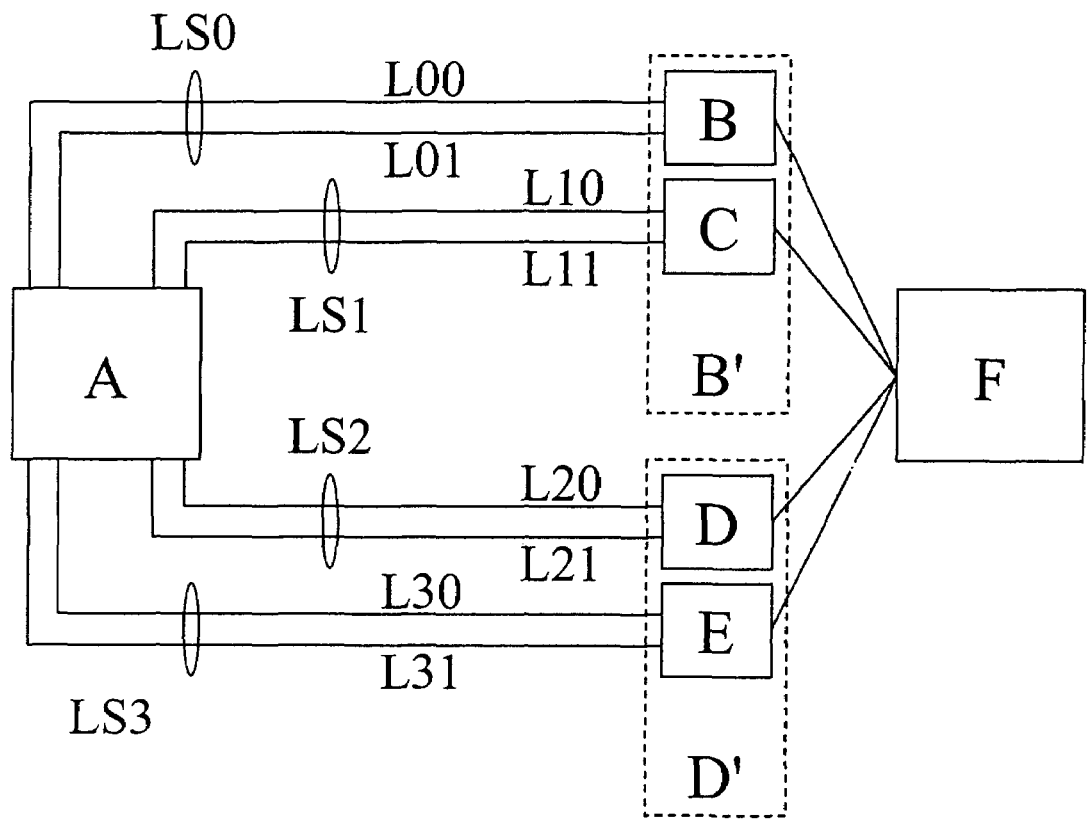
FIG. 1A shows a first signaling point connected to a second signaling point by means of four further signaling points.

FIG. 1 shows two typical network arrangements. In FIG. 1A, a first signaling point SP A is connected to a second signaling point F by means of four further signaling points SP B, SP C, SP D, SP E. Four link sets LS0, LS1, LS2, LS3 are used to establish the connection between SP A and the further signaling points SP B . . . E. In this arrangement, each of the link sets comprises two links L00, L01 and L10, L11 and L20, L21 and L30, L31. The connections between SP F and the further signaling points SP B . . . E can be implemented as desired.

Figure 1B:
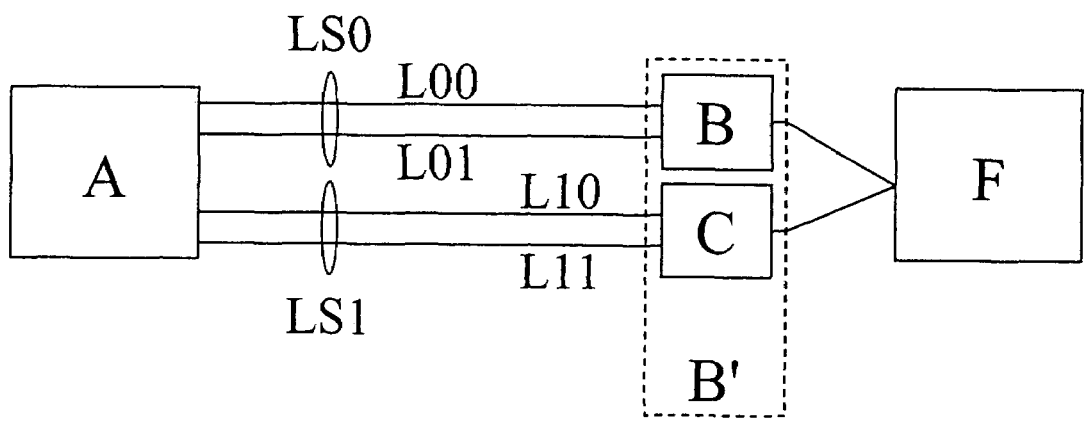
FIG. 1B shows another embodiment of the arrangement from FIG. 1A.

The arrangement in FIG. 1B corresponds to the arrangement from FIG. 1A, albeit with the omission of SP D and SP E as well as LS2 and LS3 and their assigned links L20, L21 and L30, L31.

The cited SP A and SP F can be signaling end points SEP or signaling transfer points STP. This is of no significance for the present invention, however. With regard to the communication between SP A and SP F, the further signaling points SP B, SP C, SP D, SP E are signaling transfer points STP.

The representation of the link sets as comprising two links in each case is intended to serve only as an example. In other embodiments the link sets comprise an arbitrary number of links, while the number of links for different link sets may also be different.

In an advantageous embodiment, SP B, SP C, and also SP D, SP E, represented as different STPs, as shown by the dashed lines in FIG. 1, can also be combined into functional units B', D'. Although the units B', D' each have two point codes PC, in practical configurations the units B', D' can be implemented as a unified signaling point, which can result in a situation in which there are two link sets associated with one node B', D'.

By way of example it will be described in the following, with reference to the structures in FIGS. 1A and 1B, how a distinction can be made and load sharing implemented between ISUP and SCCP traffic. By means of the present invention it is possible to realize load sharing between STPs SP B . . . E. The sending of MSUs by SP A to SP F will be considered below.

First, the possible link sets LS0, . . . , LS3 for transferring MSUs from SP A to SP F are determined and entered in a list LS at SP A. This process of determination can, as is known, be made on the basis of the point code of SP F, which is entered as a destination point code in an MSU. In the case represented in FIG. 1A, list LS is given by LS=[LS0, LS1, LS2, LS3]. In the example from FIG. 1B, list LS is given by LS=[LS0, LS1, LS0, LS1], in one embodiment also [LS0, LS1]. List LS is the result of a first step.

For selection of the link set it is established on the basis of specifications applicable to SP A which bit of the 4-bit SLS value will be evaluated in order to select a link set. These specifications are stored together with other administered data separately per destination, for example, in SP A.

The value of the bits of the SLS value that are to be evaluated is designated by Bit(SLS) and is either 0 or 1. During the evaluation of the SI value the second or third bit of the SI value can simply be used (bit positions $2^1$ or $2^2$) since these are different for SCCP and ISUP. The value of this bit is designated by Bit(SI).

The link set is selected by means of an indexed access to list LS, where 2*Bit(SLS)+Bit(SI) is used as the index.

If load sharing is to be executed over more than 4 link sets, more than one bit of the SLS value can be evaluated accordingly. For load sharing via 2 link sets, as in the arrangement shown in FIG. 1B, the selection procedure can be simplified to the extent that the evaluation of the SLS value is omitted completely and one of the two link sets is selected on the basis of the SI value.

If the bit with significance $2^1$ of the SI value is used as Bit(SI), the following selection table results for the case represented in FIG. 1A:

| LS | Bit (SLS) | Bit (SI) |
|---|---|---|
| 0 | 0 | 0 = ISUP |
| 1 | 0 | 1 = SCCP |
| 2 | 1 | 0 = ISUP |
| 3 | 1 | 1 = SCCP |

If the bit with significance $2^2$ of the SI value is used as Bit(SI), the following selection table results for the case represented in FIG. 1A:

| LS | Bit (SLS) | Bit (SI) |
|----|-----------|----------|
| 0  | 0         | 0 = SCCP |
| 1  | 0         | 1 = ISUP |
| 2  | 1         | 0 = SCCP |
| 3  | 1         | 1 = ISUP |

Following selection of the link set, a link of the link set is selected by evaluation of a further bit of the SLS value. The process of selecting a link remains the same compared with conventional methods, however.

If a link set fails or becomes active again following a failure, list LS changes. In an advantageous embodiment, link sets associated with the same unit B', D' are regarded as a pair. Accordingly, list LS for the arrangement shown in FIG. 1A results in LS=[[LS0, LS1], [LS2, LS3]]. If one link set fails, it is replaced by the other link set of the pair. When a link set becomes active again following a failure, the old status is restored.

This has the advantage that, for example, the traffic previously switched through unit B' continues to be switched entirely through unit B' if LS0 fails, since as a result of the described pair formation the still active further connection to B' is used as an alternate path with LS1. This avoids part of the traffic switched by B' needing to be taken over by unit D'. Thus, the original balance between units B' and D' is preserved.

If an entire pair fails, then the other pair is used. If a problem with a link set occurs in this pair too, no further load sharing between link sets can take place, since list LS then includes one link set.

It goes without saying that the present invention can also be used if an expansion of the "address space" opened up by the SLS field is provided by means of further fields of an MSU for load sharing over more than 16 link sets or links.

The present invention can accordingly also be used in conjunction with "virtual SLS" or other methods which ensure that a suitable number of bits that are still usable for load sharing are available for STPs in extensive SS7 networks.

Although described in connection with SCCP and ISUP, the invention can also be applied without difficulty in conjunction with all other User Parts, for example in order to separate SCCP and TUP traffic.

If only one link set is provided, the selection method according to the invention can be used for the links that are then present (not shown).

The method according to the invention can be applied without any problem to all types of SS7 networks. It can be used most particularly for conventional SS7 networks in which classical time-multiplexed TDM links are used. The method according to the invention can also be applied in particular to SS7 networks which are mapped by appropriate methods to Internet Protocol IP networks in which, for example, IP connections or IP links are therefore used instead of the TDM links and in which signaling points SP A . . . F are connected to a communications network by means of IP. Other transport media or transport protocols for SS7 can likewise be used in conjunction with the present invention.

What is claimed is:

1. A method for load distribution between a first signaling point and a second signaling point in communications networks, comprising:
   providing a Signaling System 7 for signaling between signaling points, wherein the load distribution is based on an evaluation of a service indicator SI in routing label of messages;
   distributing messages to be transmitted based on their User Part such that messages of a first User Part are distributed via a first link set and messages of a second User Part are distributed via a second link set;
   determining a list of link sets for transmitting the message to its destination;
   selecting and linking at least one of the bits of the SI field of the message to be transmitted to an index value of the list; and
   selecting the index value in order to transmit the message.

2. The method of claim 1, further comprising selecting one signaling link from multiple signaling links of the selected link set by repeating the determining and selecting and linking step for the signaling links of the link set.

3. The method of claim 1, wherein in the selecting and linking step, at least one of a bit with significance "2" and the bit with significance "4" of the SI field are taken into account.

4. A signaling point of a Signaling System 7 network comprising a device to perform a method for load distribution between a first signaling point and a second signaling point in communications networks, the method comprising:
   providing a Signaling System 7 for signaling between signaling points,
   wherein the load distribution is based on an evaluation of a service indicator SI in routing label of messages;
   distributing messages to be transmitted based on their User Part such that messages of a first User Part are distributed via a first link set and messages of a second User Part are distributed via a second link set;
   determining a list of link sets for transmitting the message to its destination;
   selecting and linking at least one of the bits of the SI field of the message to be transmitted to an index value of the list; and
   selecting the index value in order to transmit the message.

* * * * *